(12) United States Patent
Magnuson

(10) Patent No.: US 9,354,623 B2
(45) Date of Patent: May 31, 2016

(54) METHODS AND SYSTEMS FOR PIPE MANAGEMENT ON A DRILLING RIG

(71) Applicant: Nabors Industries, Inc., Houston, TX (US)

(72) Inventor: Christopher Magnuson, Houston, TX (US)

(73) Assignee: Nabors Industries, Inc., Houston, TX (US)

( * ) Notice: Subject to any disclaimer, the term of this patent is extended or adjusted under 35 U.S.C. 154(b) by 165 days.

(21) Appl. No.: 14/184,771

(22) Filed: Feb. 20, 2014

(65) Prior Publication Data

US 2015/0232272 A1  Aug. 20, 2015

(51) Int. Cl.
*G06F 7/00* (2006.01)
*G05B 15/02* (2006.01)

(52) U.S. Cl.
CPC ........................................ *G05B 15/02* (2013.01)

(58) Field of Classification Search
None
See application file for complete search history.

(56) References Cited

U.S. PATENT DOCUMENTS

| | | | |
|---|---|---|---|
| 3,978,993 A | 9/1976 | Howard | |
| 4,109,800 A | 8/1978 | Howard et al. | |
| 5,244,329 A | 9/1993 | McGill et al. | |
| 5,437,527 A | 8/1995 | McGill et al. | |
| 7,246,983 B2 | 7/2007 | Zahn et al. | |
| 7,967,541 B2 | 6/2011 | Stroshein et al. | |
| 8,215,417 B2 | 7/2012 | Annaiyappa et al. | |
| 2008/0164064 A1 | 7/2008 | Belik et al. | |
| 2009/0257848 A1* | 10/2009 | Stroshein | E21B 19/14 414/22.65 |
| 2010/0303586 A1 | 12/2010 | Hankins et al. | |
| 2012/0201632 A1 | 8/2012 | Yater et al. | |
| 2012/0212326 A1 | 8/2012 | Christiansen et al. | |
| 2012/0217024 A1 | 8/2012 | Childers et al. | |

OTHER PUBLICATIONS

International Searching Authority/Patent Cooperation Treaty, "International Search Report and the Written Opinion of the International Searching Authority," for PCT/US2015/012510, mailed May 12, 2015, 15 pages.

* cited by examiner

*Primary Examiner* — Yolanda Cumbess
(74) *Attorney, Agent, or Firm* — Haynes and Boone, LLP

(57) ABSTRACT

Apparatus and methods include a racker device for moving tubular stands on a drilling rig, a fingerboard cooperatively disposed to receive tubular stands from the racker device and to support the tubular stands in a vertical arrangement, and a racking control system in communication with the racker device and configured to control the racker device. The racking control system may include a tubular management system that receives data relating to a well plan and driller settings, assesses the well plan and driller settings, and based on the well plan and driller settings, develops a racking plan setting out proposed racking locations for the tubular stands to be used in a drilling procedure.

20 Claims, 11 Drawing Sheets

METHODS AND SYSTEMS FOR PIPE MANAGEMENT ON A DRILLING RIG

TECHNICAL FIELD

The present disclosure is directed to systems, devices, and methods for managing pipe on a drilling rig. More specifically, the present disclosure is directed to systems, devices, and methods for racking, manipulating, and using pipe on a drilling rig.

BACKGROUND OF THE DISCLOSURE

The exploration and production of hydrocarbons require the use of numerous types of tubulars also referred to as pipe. Tubulars include but are not limited to drill pipes, casings, and other threadably connectable elements used in well structures. Strings of joined tubulars, or drill strings, are often used to drill a wellbore and, with regards to casing, prevent collapse of the wellbore after drilling. These tubulars are normally assembled in groups of two or more commonly known as "stands" to be vertically stored in the derrick or mast. The derrick or mast may include a storing structure commonly referred to as a fingerboard. Fingerboards typically include a plurality of vertically elongated support structures or "fingers" each capable of receiving a plurality of "stands."

Rotary drilling and top drive drilling systems often use these stands, instead of single tubulars, to increase efficiency of drilling operations by reducing the amount of connections required to build the drill string in or directly over the wellbore. However, the manipulation of tubulars from a horizontal to a vertical position, assembly of stands and presentation of stands between the fingerboard and well center are dangerous and can be rather inefficient operations.

In addition, a lack of organization of the tubulars in the fingerboard can raise inefficiencies. For example, in a drilling operation, certain sizes or types of tubulars may be required at certain times in the drilling process, while other sizes or types of tubulars may be required at other times. Moving certain tubulars around in order to merely access other tubulars can slow the drill process, which increases rig time and well-operating expense.

Further, since some tubulars are reused at different wells, some tubulars may be repetitively exposed to high stress scenarios, leading to earlier than expected failure, delaying well progress and increasing drilling costs.

The present disclosure is directed to systems and methods that overcome one or more of the shortcomings of the prior art.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
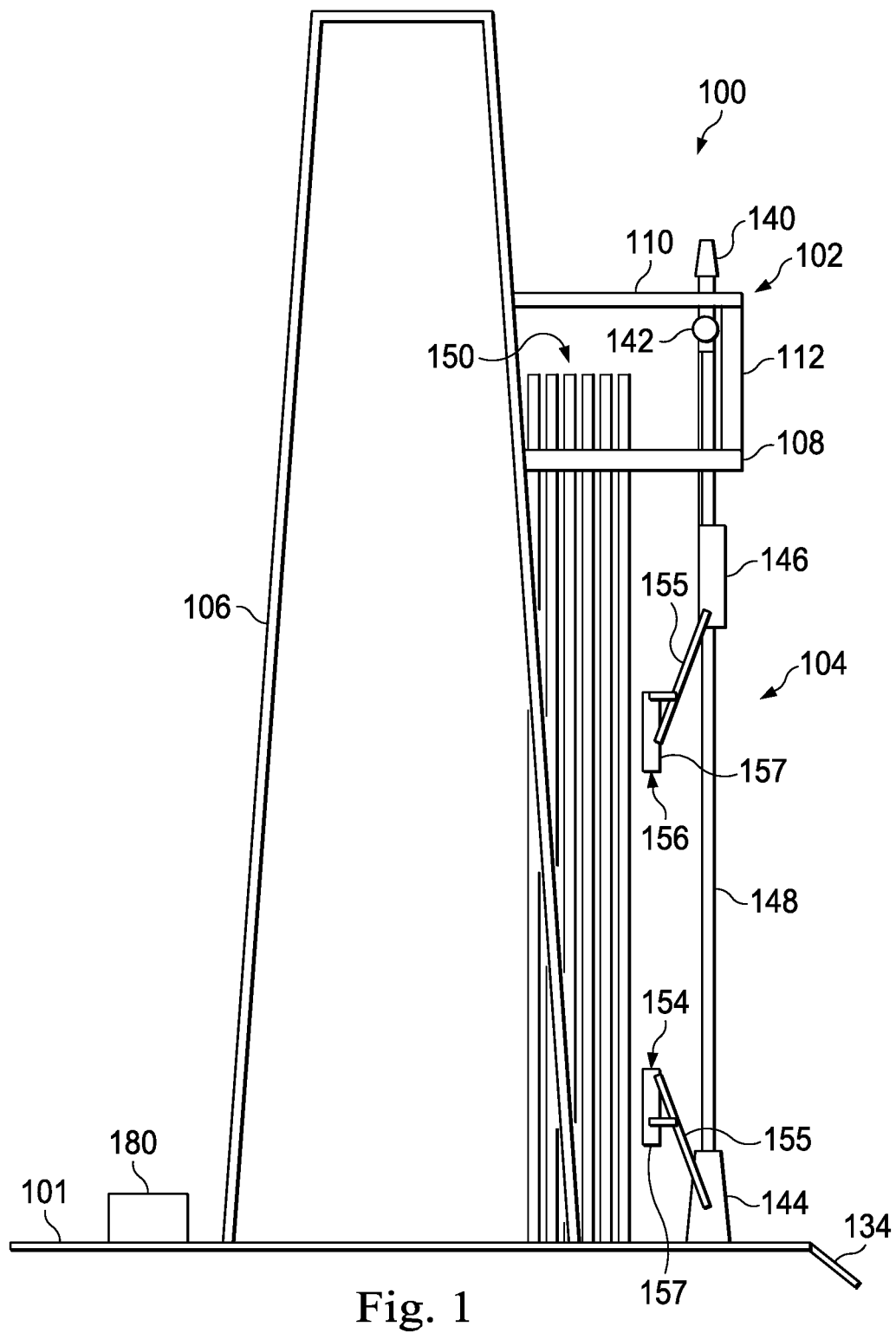
FIG. 1 is a schematic of an exemplary apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The systems, devices, and methods described herein may be used to develop and execute a pipe management plan that enables efficient placement and access to tubulars in a fingerboard and/or maintains a record of information representing wear or stress exposure of individual pipes or stands. The pipe management plan may be used by a pipe racker, either automatically or under direct control of an operator, to rack pipe stands in a location that enables efficient access to the pipe stands during a drilling operation or a tripping operation. The pipe stands may be racked in locations based on size, when they are to be used in the operation, exposure to high wear or stress, or other factors. By coordinating the racking locations of each stand, efficiencies may be obtained when tripping or when building a string.

Figure 2:
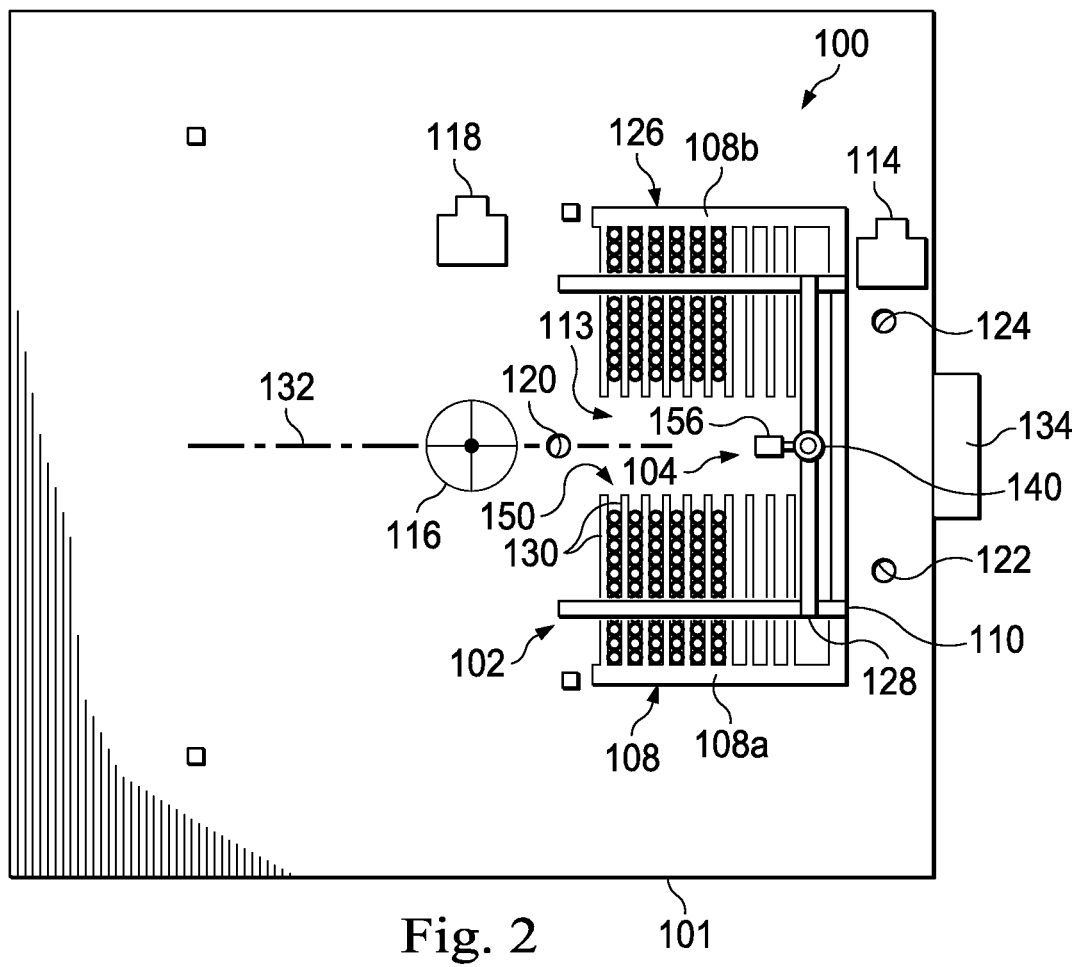
FIG. 2 is a schematic of a top view of the apparatus of FIG. 1 according to one or more aspects of the present disclosure.
Figure 3:
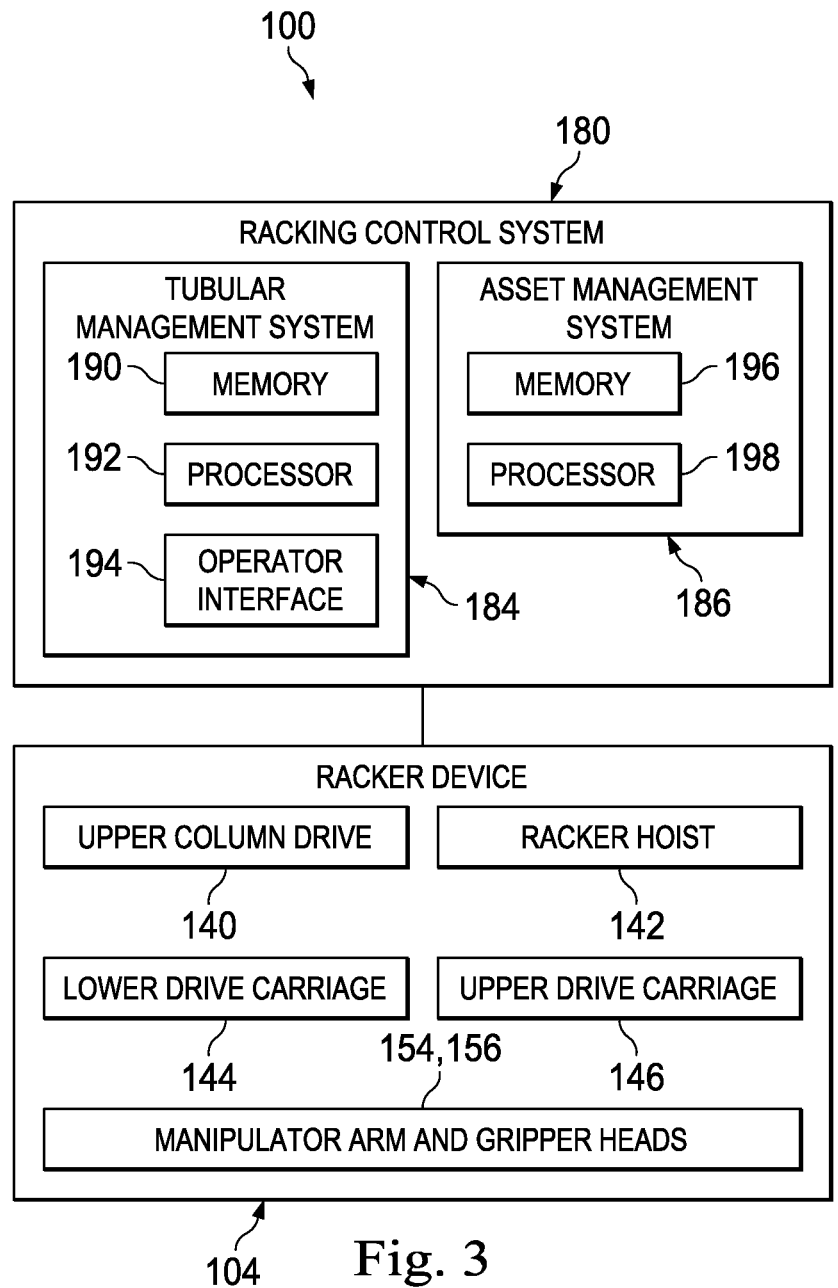
FIG. 3 is a block diagram of an exemplary apparatus according to one or more aspects of the present disclosure.

FIGS. 1-3 show the system 100 of the present disclosure, with FIG. 1 showing a side profile and FIG. 2 showing a vertical profile of the system. FIG. 3 is a block diagram showing exemplary elements of an operating system of the system 100. The system 100 will be described first with reference to FIGS. 1 and 2. In some examples, the system 100 may form a part of a mobile drilling rig having a drillfloor size of about 35×35 feet, although larger and smaller rigs are contemplated. In some embodiments, the rig is smaller than about 1600 square feet. In other embodiments, the rig is smaller than about 1200 square feet. In some embodiments, the system 100 disclosed herein permits a racker device to be used on rigs that are limited in size. In the embodiment shown, the system 100 is arranged to build stands off-set from well center, or offset from a travel path between well center and a v-door, while being maintained on a standard sized mobile drilling rig. In some embodiments, the system 100 may build stands using an off-set mousehole in the drill floor. Therefore, the system 100 may permit the well center operations, such as drilling, to be performed simultaneously with building stands in a mousehole. It may do this because the mousehole to build stands is offset and does not interfere with drilling operations. As such, the process of stand-building does not impact the rigs ability to perform drilling operations at well center.

The system 100 shown in FIGS. 1 and 2 includes a rig 101 with rig based structures and supports 102 and a racker device 104 that operates on the rig based structures and supports 102. The rig based structures and supports 102 include, for example, a mast 106, a fingerboard 108, an x-direction drive support structure 110, a diving board 112 stowed in a vertical position to allow system operation, an offline iron roughneck 114, well center 116, a well center roughneck 118, a drillfloor mousehole 120, a left side offline mousehole 122, a right side offline mousehole 124, fingerboard support structure 126, a y-direction drive support structure 128, and fingers 130 of the fingerboard 108. As used herein, the left side is the portion of the system on the left side of a center line 132 when looking from a v-door 134 on the rig 101 toward the well center 116 and the right side is the portion of the system 100 on the right side of the center line 132 when looking from the v-door 134 toward the well center 116.

The racker device 104 includes a modular racker upper column drive 140, a modular racker hoist 142, a lower drive carriage 144, an upper drive carriage 146, and a racker support column 148. Drill pipe stands 150 are shown in FIGS. 1 and 2 and may be transferred by the racker device 104 on the rig based structures and supports 102 to positions in a mousehole for assembly or disassembly, transferred into and out of the fingerboard 108, and transferred into or out of the well center 116 among other transfer locations.

The racker support column 148 may be formed of a single beam or multiple beams and may be formed in a single or multiple lengths joined together. In some embodiments, the racker support column 148 is a structural support along which the upper drive carriage 146 may move upward or downward on wheels.

In some exemplary embodiments, the upper column drive 140 is configured to move the upper portion of the racker support column 148 along the y-direction drive support structure 128 and along the x-direction drive support structure 110. Accordingly, it may have a portion disposed at the interface between the y-direction support structure 128 and the racker support column 148, and it may have a portion disposed at the interface between the y-direction drive support structure 128 and the x-direction drive support structure 110. In addition, it may operate the racker hoist 142 and may be configured to raise and lower the upper drive carriage 146 along the racker support column 148. The racker hoist 142 may be in operable engagement with the upper column drive 140 and may be driven by the upper column drive 140. In some embodiments, it moves the upper drive carriage 146 up or down in the vertical direction along the racker support column 148.

The lower drive carriage 144 and the upper drive carriage 146 cooperate to manipulate tubulars and/or stands. The lower drive carriage 144 also includes a drive system that allows the lower drive carriage 144 to displace along the rig floor. In some embodiments, this occurs along rails or tracks (not shown) disposed on or adjacent the rig floor. The lower and upper drive carriages 144, 146 may respectively include a lower manipulator arm and gripper head 154 and an upper manipulator arm and gripper head 156. Each includes a manipulator arm 155 and a gripper head 157. The gripper heads 157 may be sized and shaped to open and close to grasp or retain tubing, such as tubulars or stands. The manipulator arms 155 may move the gripper heads 157 toward and away from the racker support column 148. These upper and lower manipulator arm and gripper heads 156, 154 are configured to reach out to insert a drill pipe stand into or remove a drill pipe stand from the fingerboard 108. That is, the upper and lower manipulator arm and gripper heads 156, 154 extend outwardly in the y-direction, the x-direction, or some other direction from the racker support column 148 to clamp onto or otherwise secure a drill pipe stand that is in the fingerboard 108 or to place a drill pipe stand in the fingerboard 108. As indicated above, the upper drive carriage 146 may operate in a z-direction along the racker support column 148. In some aspects, it is operated by the hoist 142.

Figure 6:
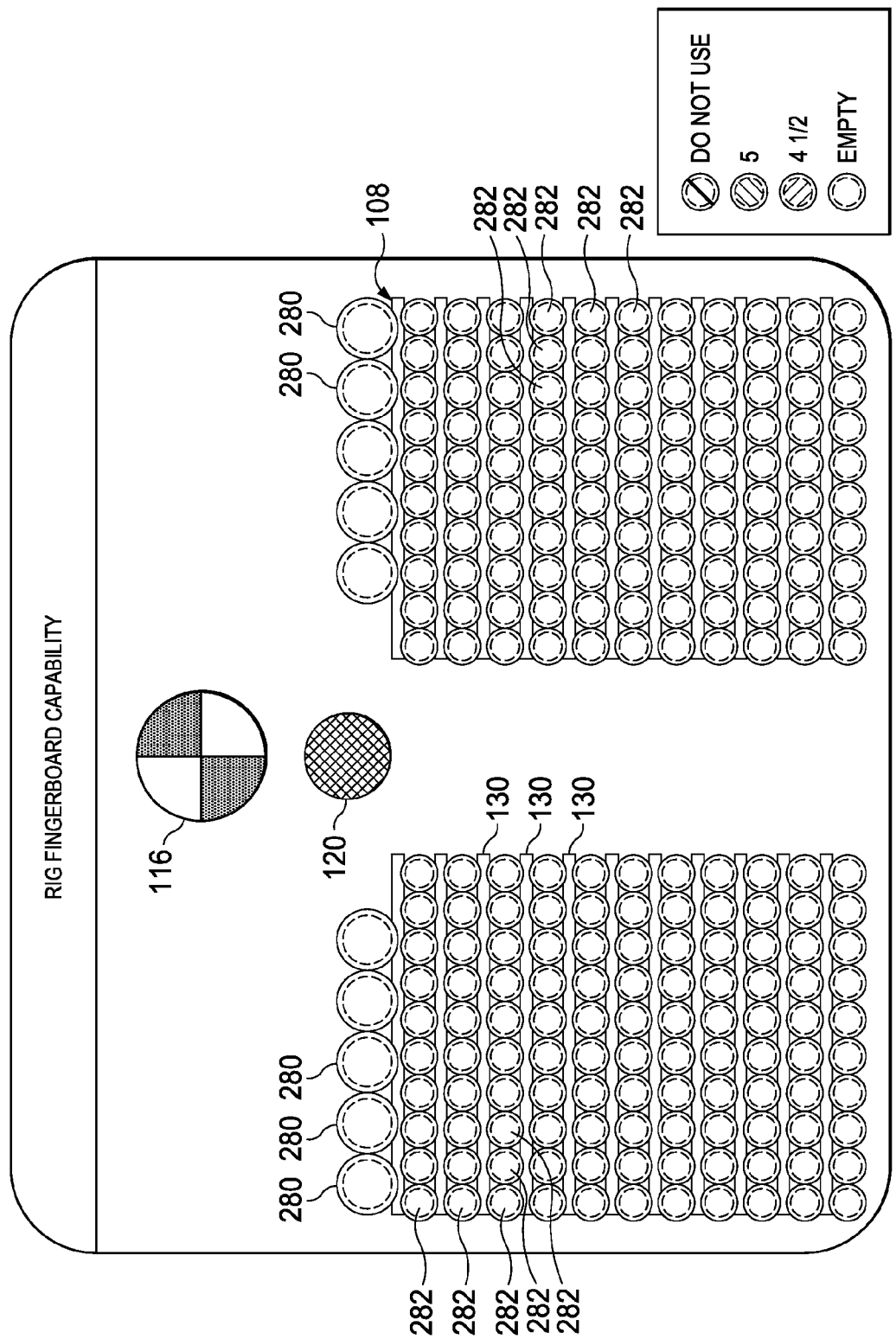
FIG. 6 is a schematic of a top view of a fingerboard according to one or more aspects of the present disclosure.

The fingerboard 108 is a rack formed of a plurality of fingers 130 spaced to receive pipe stands and maintain the pipe stands in a substantially vertical orientation. The fingers 130 extend substantially parallel to one another, and in the embodiment shown, form a left side fingerboard portion 108a and a right side fingerboard portion 108b. These portions 108a, 108b in FIG. 6 are aligned so that the fingers 130 all extend in parallel lines in a direction substantially perpendicular to a line extending between well center 116 and a v-door 134. In other embodiments, the fingers 130 of each portion 108a, 108b are parallel to each other and oblique to a line extending between well center 116 and a v-door 134. The spacing between the two portions 108a, 108b of the fingerboard 108 forms a gap 113 that provides a travel path for racker device 104 to move between the v-door 134 and the well center 116. The fingerboard support structure 126 is a frame support structure that supports the fingers and provides rigidity to the fingerboard 108.

In the embodiment shown, the x-direction drive support structure 110 and the y-direction drive support structure 128 are structural beams disposed at a higher elevation than the fingerboard 108. In some embodiments, the x-direction drive support structure 110 and the y-direction drive support structure 128 are disposed at a higher elevation than stands within the fingerboard 108. For example, they may be disposed to be higher than a double or a triple stand. In the exemplary embodiment shown, the x-direction drive support structure 110 includes two parallel support structures extending in an x-direction parallel to the gap 113 between the portions 108a, 108b of the fingerboard 108. In some embodiments, the x-direction drive support structure 110 may be fixed in place relative to the mast 106 and other supporting structure. The y-direction drive support structure 128 may be carried by the x-direction drive support structure 110 and may move in the x-direction along the x-direction drive support structure 110. In this embodiment, the y-direction drive support structure 128 is a beam. As will be explained below, the racker device 104 may move along the y-direction drive support structure 128, thereby providing mobility to the racker device 104 in the y-direction. In addition, the y-direction drive support structure 128 may move along the x-direction drive support structure 110, thereby providing mobility to the racker device 104 (carried by the y-direction support structure 128) in the x-direction. It is worth noting that during standard operation of manipulating stands, the racker column support 148 of the racker device 104 may move in the x-direction in the gap 113 between the portions of the fingerboard 108. With the racker device so positioned, the upper and lower manipulator arm and gripper heads 156, 154 extend outwardly in the y-direction, x-direction, or an oblique direction from the racker support column 148 when placing a stand in or removing a stand from the fingerboard 108, a mousehole, or well center 116.

As can be seen in FIG. 2, the x-direction drive support structure 110 is offset from a line 132 in the x-direction extending between well center 116 and the v-door 134. Because of this, the racker support column 148 may be moved in the x-direction, but also may be stowed or moved offline in the y-direction. As used herein, the term "offline" is meant to include a position that is offset from the line 132 extending in the x-direction through the well center 116 and the v-door 134 of the drilling rig. In FIG. 2, this line is represented racking control system by the dashed line 132, extending between well center 116 and the v-door 134 providing access to the rig floor. Additional details of the drilling rig system may be found in U.S. application Ser. No. 14/159,722, filed Jan. 21, 2014, incorporated herein by reference.

The system 100 also includes a racking control system 180 that controls the racker device 104 and other rig components, while also creating and developing a racking plan for the management of tubulars or stands as a part of a drilling operation. In some embodiments, the racking control system 180 may be disposed on the rig, such as in a driller's cabin, may be disposed in a control truck off the rig, or may disposed elsewhere about the drilling site. In some embodiments, the racking control system 180 is disposed remote from the drilling site, such as in a central drill monitoring facility remote from the drill site.

FIG. 3 is a block diagram showing some elements of the system 100 including the racking control system 180 and the racker device 104. In this embodiment, the racking control system 180 generates a racking plan for the placement of tubulars within the fingerboard 108 and controls the racker device 104 and other rig components to makeup and takedown stands and to autonomously manipulate tubulars into and out of the fingerboard 108 and into and out of the wellbore. Although described with reference to the system 100 above, the racking control system 180 may operate with other rig systems having different setups and component arrangements than those described in the paragraphs herein.

The racking control system 180 includes a tubular management system 184 and an asset management system 186. The tubular management system 184 is a computer system that determines and allocates a location in the fingerboard 108 for placement of tubulars within the fingerboard 108 based upon information from a well plan and other information. Accordingly, the tubular management system 184 is configured to organize the tubular stands in a manner to perform efficient drilling and rig operations. The asset management system 186 is configured to monitor and track wear and condition of individual tubulars and stands. The asset management system 186 may track and store information relating to prior use, prior applied stresses, prior locations within a drill string, and other information relating to wear on the tubular stand. Using this information, the asset management system 186 may provide data used by, for example, the tubular management system 184, to allocate a location within a drillstring, and a location within a fingerboard, based on the remaining strength and durability of a particular tubular or stand.

The tubular management system 184 includes a memory 190, a processor 192 and an operator interface 194. The processor 192 may be an integrated circuit with power, input, and output pins capable of performing logic functions, or may be a controller that controls different components that perform different functions. The processor 192 may be any processor known in the art and may be comprised of multiple processors and may be a part of or may be formed of other types of controllers known in the art. To execute a well plan, the processor 192 is configured to process information in the memory 190 and information provided by a drilling operator to create a racking plan and execute the racking plan during the drilling operation.

The memory 190 may be a semiconductor memory that interfaces with the processor 192 or any other memory capable of storing information or instructions to be accessed by the processor 192. In one example, the processor 192 can write to and read from the memory 190. For example, the processor 192 can be configured to read data relating to the system operation and write that data to the memory 190. The processor 192 is also capable of performing other memory functions, such as erasing or overwriting the memory 190, detecting when the memory 190 is full, and other common functions associated with managing semiconductor memory. In some aspects, the memory 190 includes executable programs, data, processes, and instructions for creating a tubular management plan for storing tubular stands and/or for the makeup or breakdown of tubular stands. It also may include executable programs, data, processes, and instructions for acting on data from the asset management system 186 to allocate individual tubulars or stands to positions or locations depending on the amount of wear or stress previously applied on the tubular or stand. In some embodiments, the memory 190 encompasses local memory and larger database memory that stores information relating to system operation, component data, or other information.

The operator interface 214 allows an operator to input and receive information relating to the well plan, driller settings, or other information that may be useful or should be considered by the tubular management system 184 when developing or executing a tubular racking plan. This may include any input device and any output device known in the art, including keyboards, mice, knobs, switches, and display screens, among others.

The asset management system 184 may be disposed proximate or remote from the tubular management system 184. In some embodiments, the asset management shares a common memory and processor with the tubular management system 184, such that the asset management system and the tubular management system are both processes operating on the same server or computer. In other embodiments, the asset management system 186 is disposed remote from the tubular management system 184 and they may communicate using any networking medium. The asset management system 186 includes a memory 196 that may include a database that stores information relating to a plurality of tubulars or stands to be used within the well plan. In some embodiments, the memory 196 may export or import information gathered or obtained from other well sites and may serve as an information repository for multiple well sites. The processor 198 may be a processor as described above with respect to the processor 192, or other processor.

The tubular management system 184 may receive information or data from the asset management system 186 to enable the tubular management system 184 to develop a racking plan, taking into account information indicative of the useful life of a particular tubular or stand. For example, the information received from the asset management system 186 may include wear data and applied stress data relating to specific tubulars. Based on the information, the tubular management system 184 may act to reduce the amount of stress on specific tubulars identified by the asset management system 186 by allocating them a location in the drill string with lower stress or wear than other locations in the drill string. The racking location may then be determined taking into account the desired or allocated position in the drill string.

The racking control system 180 communicates with the racker device 104 and/or other components on the rig system 100 to carry out the racking plan. The racking control system 180 may communicate signals, instructions, or other information to operate the racker device 104 in a manner to execute the racking plan. In some embodiments, the racking control system 180 sends signals or control signals to the racker hoist 142, the manipulator arm and gripper heads 154, 156, the upper drive carriage 146, the lower drive carriage 144, and the upper column drive 140. Under the control of the racking control system 180, the racker device 104 may execute the racker plan. It is worth noting some exemplary embodiments have an integrated rig control system that cooperates with, forms a part of, of or includes the racking control system 180. This system may utilize a well plan input and may control components of a rig, such as a top drive, mud pumps, drawworks, roughnecks, hydraulic elevators, slips, solids control, power systems, anti-collision, and auxiliary functions. The integration or cooperation of the racking control system and the rig control system may result in a fully automated rig with autonomous control capability. In some aspects, this automated rig would not require driller input other than specified settings and would allow the driller to transition into an oversight position ensuring the rig and controls are acting according to the proscribed well plan. In some aspects, the user may input driller settings in the rig system 100 that include solid control inputs identifying the need for a wiper trip. This may result in an unplanned trip for the purpose of solids control through a wiper trip.

Figure 4:
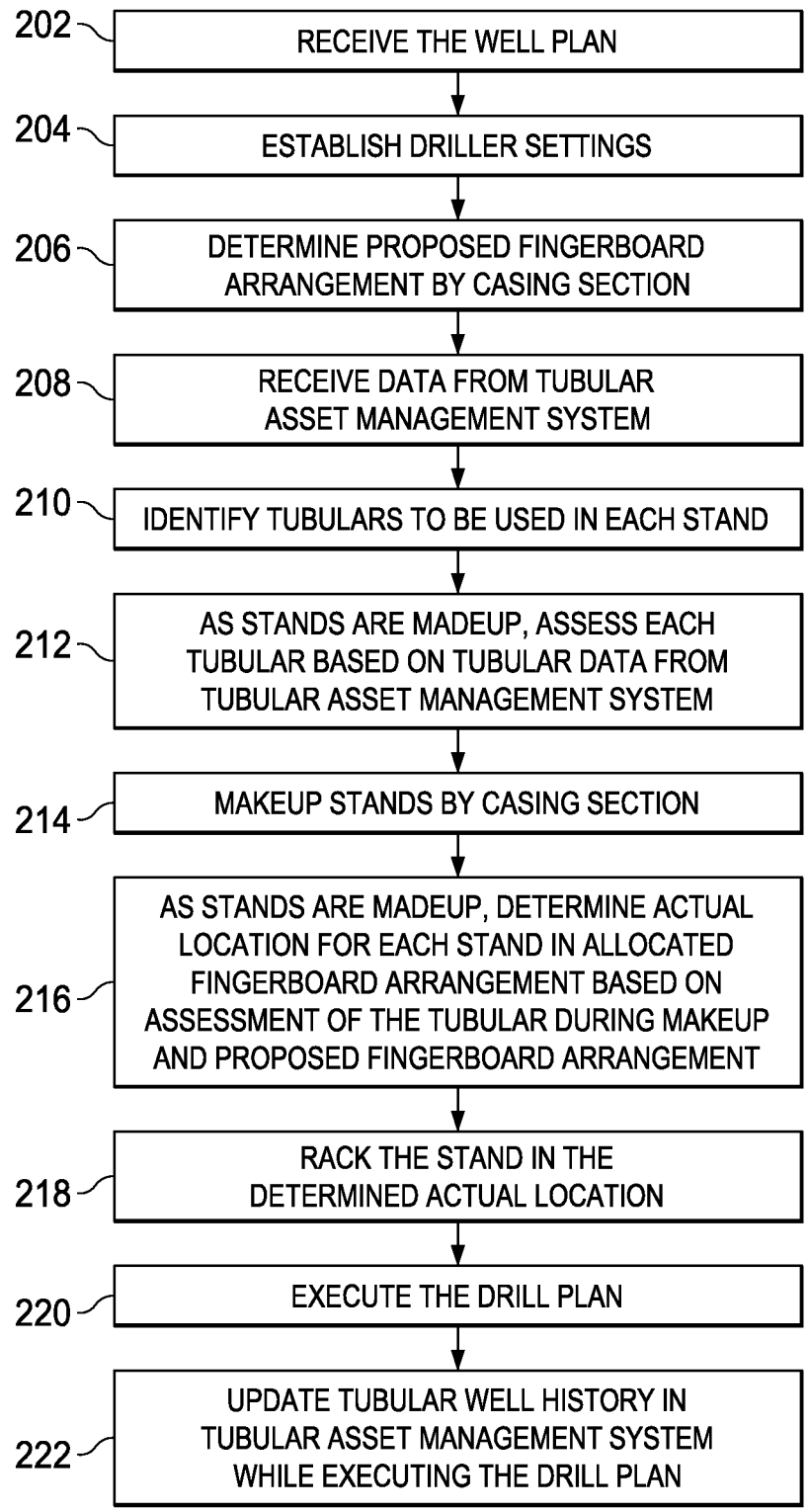
FIG. 4 is a flow-chart diagram of at least a portion of a method according to one or more aspects of the present disclosure.

FIG. 4 is a flow chart showing an exemplary method of creating a racker plan for execution by the racker device 104 and/or other components of the drilling rig system 100. The method may be performed, for example, by the racking control system 180. In some examples, a racker plan is fully generated before being executed. In other examples, the racker plan is generated in real-time, as the plan is being carried out. The method in FIG. 4 begins at 202 of receiving a well plan. The well plan may be entered into, uploaded, or otherwise transferred into the racking control system 180. In some embodiments, it is inputted into the memory 190 of the tubular management system 184. In other embodiments, it is accessed by the tubular management system 184, but stored elsewhere. The well plan may be provided by an operator and may take into account drilling factors relating to geography, hazards, and other information used to execute and accomplish the drilling operation. In some embodiments, the well plan takes into account water depth, if applicable, such as in offshore drilling operations, conductor pipe depth, casing sections by measured depth and total vertical depth, including the location of casing hangers. Other information in the well plan may include bottom hole assembly and hole size by casing sections, drill pipe size (for example, 5 inch S-135), mud weight by section of the proposed well, among other factors. In some aspects, the well plan may also include a kickoff location, a deviation angle including a target measured depth and a total vertical depth, inclination, and azimuth. Some well plans include cementing requirements, drill past casing requirements, hydraulic and rotary torque requirements, and expected environmental factors such as temperature and pressure. In some embodiments, the operator sets up a complete well plan and either imports it into the tubular management system or creates the complete well plan within the tubular management system 184. In some embodiments, rather than the complete well plan being entered into or imported into the tubular management system 184, only certain key factors are entered into or imported into the tubular management system 184.

At 204 in the method 200, a drilling contractor may provide driller settings for the rig elements of the system 100. Driller settings may include, for example, drill floor specifications and requirements and equipment requirements such as the fingerboard specifications. The settings may also include operator preferences for the system 100. For example, the settings may include desired tubular arrangements, such as driller side versus offdriller side loading of pipe stands. They may also include preferences such as placing pipe stands first on the fingerboard side opposite the driller's cabin. This may, in some rig arrangements, provide a better view of the racker device 104 from the driller's cabin on the rig. Driller settings may also include rig and drill string setup information, such as desired racking locations and the specifications of a bottom hole assembly (BHA) and of drill collars, including, for example, specific lengths or weights. In one example, the BHA is 130 feet long, although other lengths are contemplated. It may include bit centralizers, drill collars, and mud motors. Therefore, the tubular management system 184 may take into account the length of the BHA when developing a racking plan for the particular drilling operation. The dimensions and specifications of the BHA and the drill collars may also be important as the racking control system 180 develops a racking plan for these components. Other factors that may be input as driller settings may include the drill pipe size and range. For example, in some embodiments the driller settings may include a 5 inch space S-135 range 2 (31 feet) as the drill pipe specification. It may also include BHA arrangement by section. Additional information may be included in the driller settings for the rig itself such as a methodology and system for evaluating the mud down hole and/or through a solid control system. This solids control system may specify the required parameters for when rig operations may need to be provided such as a wiper trip to a specified depth resulting in the rig tripping out of the hole.

Based on the received well plan and the established driller settings, the tubular management system 184 may determine a proposed fingerboard arrangement by casing section at 206. That is, the tubular management system 184 of the racking control system 180 may determine or create a proposed fingerboard arrangement for the casings based on the well plan and the driller settings. Additional details for step 206 will be discussed further below with reference to FIG. 5.

At 208 in FIG. 4, the tubular management system 184 may receive information from the asset management system 186. As indicated above, the asset management system 186 may provide information relating to prior use of a particular stand or tubular, and may include specification and historical data, such as, for example, drill pipe diameter (e.g., 4.5 inches or 5 inches, for example), range, length, inspection history, service and repair history, and its well history by phase, location and/or stresses. In some embodiments, the information from the asset management system 186 is external data imported and used in tubular management system computations to ensure that tubulars or stands previously subjected to high stress, high loading, or physical wear may be used primarily in lower stress, lower loading, or less physical wear locations in the drill string. The information may be received by accessing the memory of the asset management system 186 directly (whether local or remote) or by having the information transferred via a transportable storage drive.

At 210 the tubular management system 184 identifies the tubulars to be used in each stand. It may do this as the tubulars are introduced to the v-door, as they are introduced into the mousehole or at some other time before or during the stand-building process. The tubulars may be identified using any number of methods. Some exemplary methods use a tagging system to identify the tubulars and stands. The tagging system may include a particular tag or indicia unique to and associated with each individual tubular or stand. For example a barcode, a set of digits, or other indicia on the tubulars may be used to uniquely identify individual tubulars or stands. The identifiers may be scanned or otherwise entered into the tubular management system 184. In some embodiments, some or all of the specification or historical information may be indicated by the tag or indicia on the tubular or stand rather than a separate database. For example, in one embodiment, the tag indicates the specification information for the particular tubular.

At 212, the tubular management system 184 assesses each identified tubular based on the specification and historical use data. This may include assessing the stands by associating the information from the asset management system 186 and/or identification tag or indicia including assessing the received historical or specification information relating to tubulars making up the stand. The assessment may apply a rating or other trackable indicator relating to tubular condition and remaining useful life. Alternatively, it may apply a rating or trackable indicator of the amount of wear or previously applied stresses on the tubular.

At 214 the tubular management system 184 makes up the stands for each casing section of the well plan and assesses the stands based on data from the tubular asset management system. Making up the stands may include operating the racker device 104 to build stands offline or inline. In doing this, the tubular management system 184 may control the racker device 104 which may receive tubulars through the v-door 134, may carry the tubulars to the drill floor mouse hole 120 or other mousehole and may build stands using the tubulars.

At 216, the tubular management system 184 determines a proposed location for each stand in the allocated fingerboard arrangement based on the assessment of the tubular during makeup and based on the fingerboard arrangement. For example, the tubular management system 184 may evaluate the history and data relating to the tubulars and may designate the storage location in the fingerboard based on the history and data. Accordingly, a stand comprising tubulars previously subjected to high stress in prior wells may be racked in the fingerboard 108 in a location that will correspond to a low stress location in the drill string. In some embodiments, the tubular management system 184 may take into account information about each pipe and each stand. These may be measured and checked simultaneously with building the stands.

At 218 each stand built is racked in the proposed location in the fingerboard 108. With the stands racked in the fingerboard 108, drilling according to the well plan may be carried out in an efficient manner. This may include controlling the racker device 104 to pull a stand from the fingerboard 108, move the stand over well center 116, and to connect the stand to the drill string so that the tubular stand can be advanced into the wellbore. As each tubular and/or stand is introduced into the drill hole, the tubular's or stand's history in the asset management system 186 may be updated to indicate the stand's or the tubular's use. Accordingly, the asset management system 222 may be updated to indicate the additional location of the stand or tubular within the drill string and the expected stress or wear that may occur based on the location of the stand or tubular in the drill string. In some instances, this includes scanning the identifying information (e.g., tags such as barcodes indicia, or other identifier) associated with the tubular or the stand. The asset management system 186 may then identify and track the wear on the specific tubulars or stands.

Figure 5:
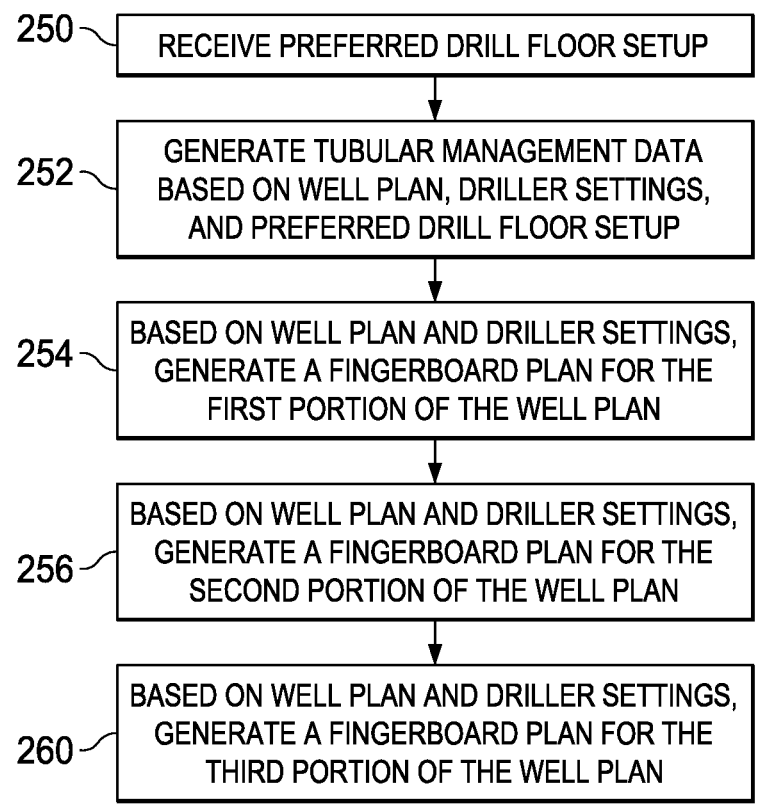
FIG. 5 is a flow-chart diagram of at least a portion of a method according to one or more aspects of the present disclosure.

FIG. 5 shows an exemplary method used to carry out step 206 of FIG. 4 to determine a proposed fingerboard arrangement by casing section. The fingerboard arrangement by casing section is determined by the tubular management system 184 using driller settings and the well plan information received at steps 202, 204 in FIG. 4. In some embodiments, the driller setting includes preferred drill floor setup information. This may include, in addition to the other driller settings disclosed herein, additional information that may be specific to a particular rig or a particular preference of an operator. For example, the preferred drill floor setup may include identifying specific positions for stands or tubulars or a specific arrangement stands or tubulars based on driller preferences or based on the drill floor size and layout. In one example, based on the relative position of drill center 116, the operator may desire to fill the off driller's side of the fingerboard before filling the driller's side of the fingerboard. Depending on how the drill pipe is introduced to the rig, the operator may desire to fill the off-driller's side first to create efficiencies or to maintain a wide visual range by placing stands where they do not interfere with visual observations. Some operators may prefer that the driller's-side fingerboard be filled in order starting with positions closest the well center 116 and extending toward the v-door 134. The preferred setup may include fingerboard allocations that are reserved or intended to remain unfilled. The preferred setup may also include confirmation of drill pipe dimensional information. For example, the driller may prefer to confirm the drill pipe range and size, such as range 2 being between 31 to 32 feet, or range 3 being between 40 and 45 feet. In some aspects, the driller preferences may include confirming the BHA size, such as 130 feet long in three sections, each having a length of 40 to 45 feet. Preferred fingerboard setups may include other tubular arrangement allocation preferences. For example, an operator may reserve an end spot of each stand row to be left empty. Accordingly, instead of ten stands per row, for example, the tubular management system may allocate only nine stands per row.

In one example, the drill floor setup take into account the fingerboard layout or capacity to generate a racking plan. FIG. 6 shows the exemplary layout of a fingerboard 108. More particularly, it shows the well center 116, the mouse hole 120, and locations in the fingerboard 108 that may receive stands to be used when executing the well plan. In FIG. 6, each circle identifies a potential location for a stand. As can be seen in FIG. 6, a number of the stand locations 280 disposed closer to the well center 116 are larger in diameter than the other stand locations. These stand locations 280 may be used to accommodate larger diameter equipment and pipe stands, such as those associated with the BHA or other larger components such as bit centralizers, drill collars, and mud motors. In this embodiment, the remaining available locations for tubular stands, some of which are labeled 282, are all shown as being suitable for tubular stands of a similar size.

Returning to FIG. 5, at 252, the tubular management system 184 generates a fingerboard plan for a first portion of the well plan. This may include allocating tubular stands to carry out the first portion of the well plan. This is described with reference to FIG. 7.

Figure 7:
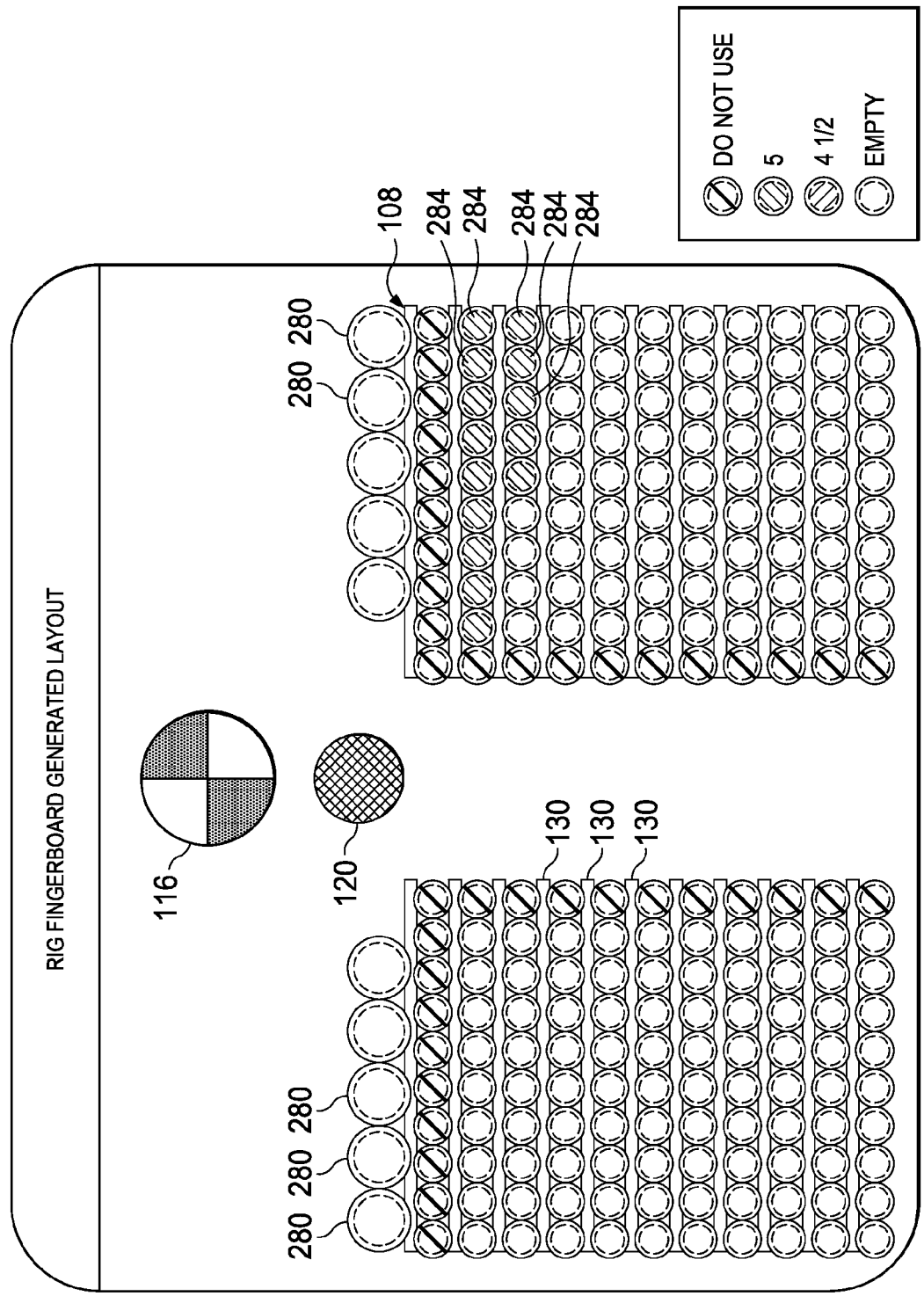
FIG. 7 is a schematic of a top view of a fingerboard according to one or more aspects of the present disclosure.

FIG. 7 shows a generated layout or a proposed fingerboard plan for a first portion of the well plan, created at 252. In the embodiment shown in FIG. 7, the preferred drill floor setup established with the driller settings at 248 included a preference to leave unallocated the first pipe location in between adjacent fingers 130 of the fingerboard 108. The preferred drill floor setup may also include reserving or unallocating the first row of the fingerboard 108 to separate the stands from the larger diameter equipment that may be allocated to the locations 280.

Continuing, generating the fingerboard plan at the 252 may take into account the well plan, the driller's settings, and the preferred drill floor setup. In one example, the well plan data may include casing length, mud weight, BHA length, measured depth, and the length of stands.

An example for generating a fingerboard plan is provided below using an exemplary well plan. The exemplary well plan may include a first section requiring a casing section of 1,250 feet having a diameter of 13⅜ with the hole size of 17½ inches, requiring a mud weight of 8.4 pounds per gallon, and requiring a measured depth of 1,250 feet with a total vertical depth of 1,250 feet. Additional data may include may include a drill past casing (DPC) setting of 100 feet, and may include a BHA length of 130 feet. The tubular management system 184 may consider this information and determine that the sum of the measured depth and the DPC minus the BHA length equals 1250+100−130=1,220 feet. If each stand equals 93 feet, then 13.11 stands are needed for the first section of the wellbore (1,220 divided by 93 equals 13.11 stands). Therefore, the well plan calls for 14 stands of 5 inch pipe. Applying this to the rig fingerboard generated layout in FIG. 7, the tubular management system 184 allocates fourteen spots 284 for stands to drill the first section of the well plan. In the example shown, this takes up two rows in the fingerboard 108. As such, taking into account the well plan, the driller settings, and the preferred drill course setup, the tubular management system 184 has generated the fingerboard plan for the first portion of the well plan as shown in FIG. 7.

At 256, the tubular management system 184 generates a proposed fingerboard plan for a second portion of the well plan that allocates fingerboard rows to stand for a second portion of the well plan. In a manner similar to that described above, the tubular management system 184 may take into account dimensional aspects of the well plan.

Figure 8:
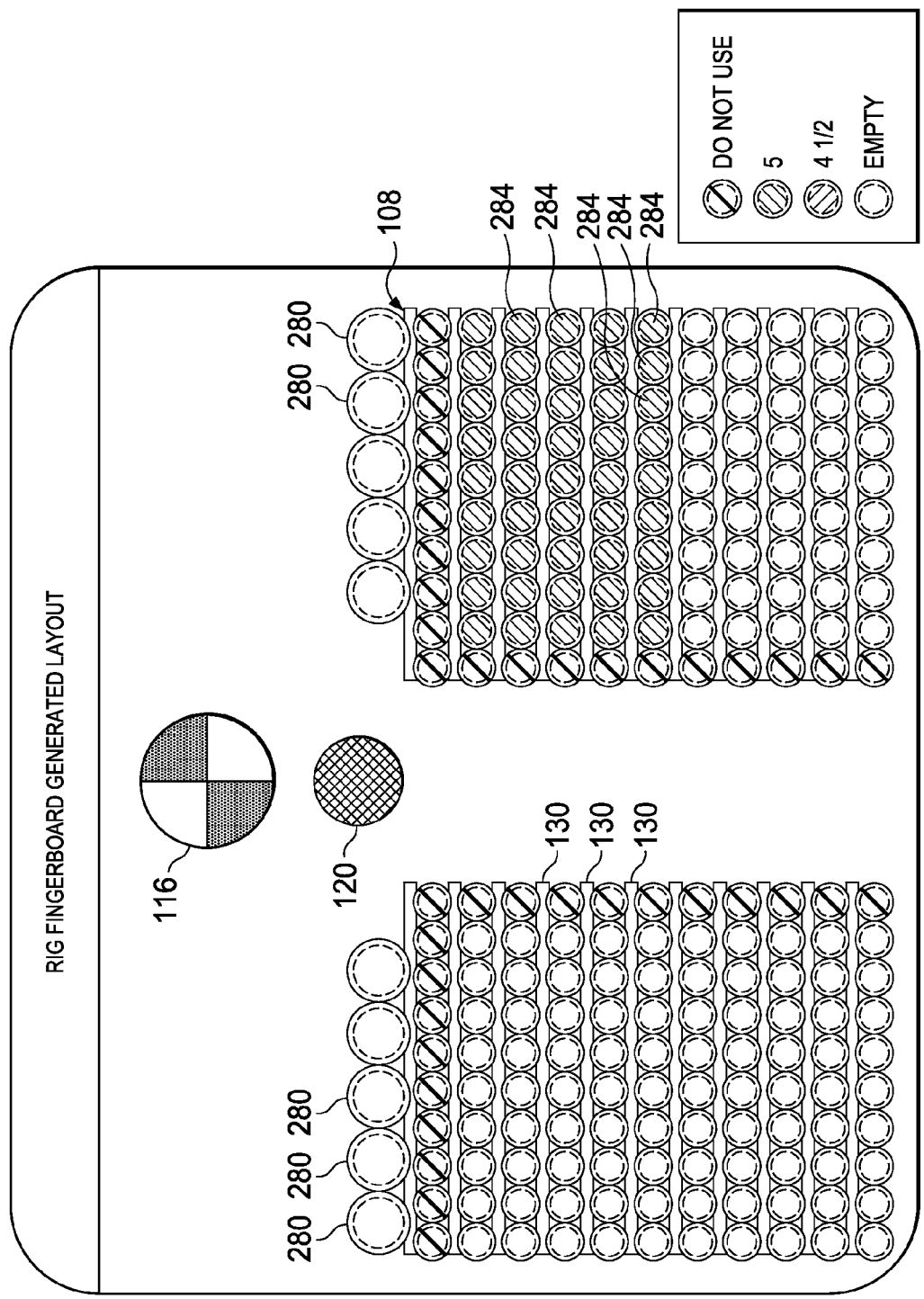
FIG. 8 is a schematic of a top view of a fingerboard according to one or more aspects of the present disclosure.

Again, for illustration without limitation, the exemplary well plan may include a second section requiring a casing section of 4204 feet having a diameter of 8⅝ inch with the hole size of 11 inches, requiring a mud weight of 8.4-10.1 pounds per gallon, and requiring a measured depth of 4204 feet with a total vertical depth of 4,204 feet. Based on the requirements of the well plan, the tubular management system 184 may take into account a drill past casing length and the BHA length to determine the total number of stands required for the second section of the well plan. For example, taking the measured DPC minus the BHA equals 4,204+100−130=4,174. Accordingly, the second portion of the drill plan requires stands totaling 4,174 feet. Since each stand is 93 feet, this requires 44.88 stands, therefore, 45 stands of 5 inch drill pipe may be allocated to the fingerboard. FIG. 8 shows 45 stands with 9 stands per row in the fingerboard equaling 5 rows of stands. Therefore, the second section as shown in FIG. 8 requires 5 rows of stands in the fingerboard to be filled.

It is worth noting that the second section of the wellplan includes or adds to the first section of the well plan. In this example however, the casing section for the second section of the well plan utilizes drill pipe stands having the same diameter as drill pipe stands utilized with the casing section for the first section of the wellplan. Therefore, the stands of drill pipe for the first casing section and the second casing section in FIG. 8 appear indistinguishable from each. In other examples however, the stands of drill pipe for the first casing section have a different diameter than the stands of drill pipe for the second casing section. The different diameter drill pipe stands in different sections may be used to address (such as to limit) the hookload while still maintaining an adequate hydraulic capability based on the internal diameter of the drill pipe, mud pressure and mud flow.

At 260, the process is repeated for a third portion of the well plan. That is, based on the well plan and the driller settings including a preferred drill floor setup, the tubular management system 184 generates a fingerboard plan for the third portion of the well plan. In a manner similar to that described above, the tubular management system 184 may take into account dimensional aspects of the well plan. Again, for illustration without limitation, the exemplary well plan may include a third section requiring a casing section of 13038 feet having a diameter of 5½ inch with a hole size of 7⅞ inch, requiring a mud weight of 8.8-9.3 pounds per gallon, and requiring a measured depth of 13038 with a total vertical depth of 8047 feet.

Figure 9:
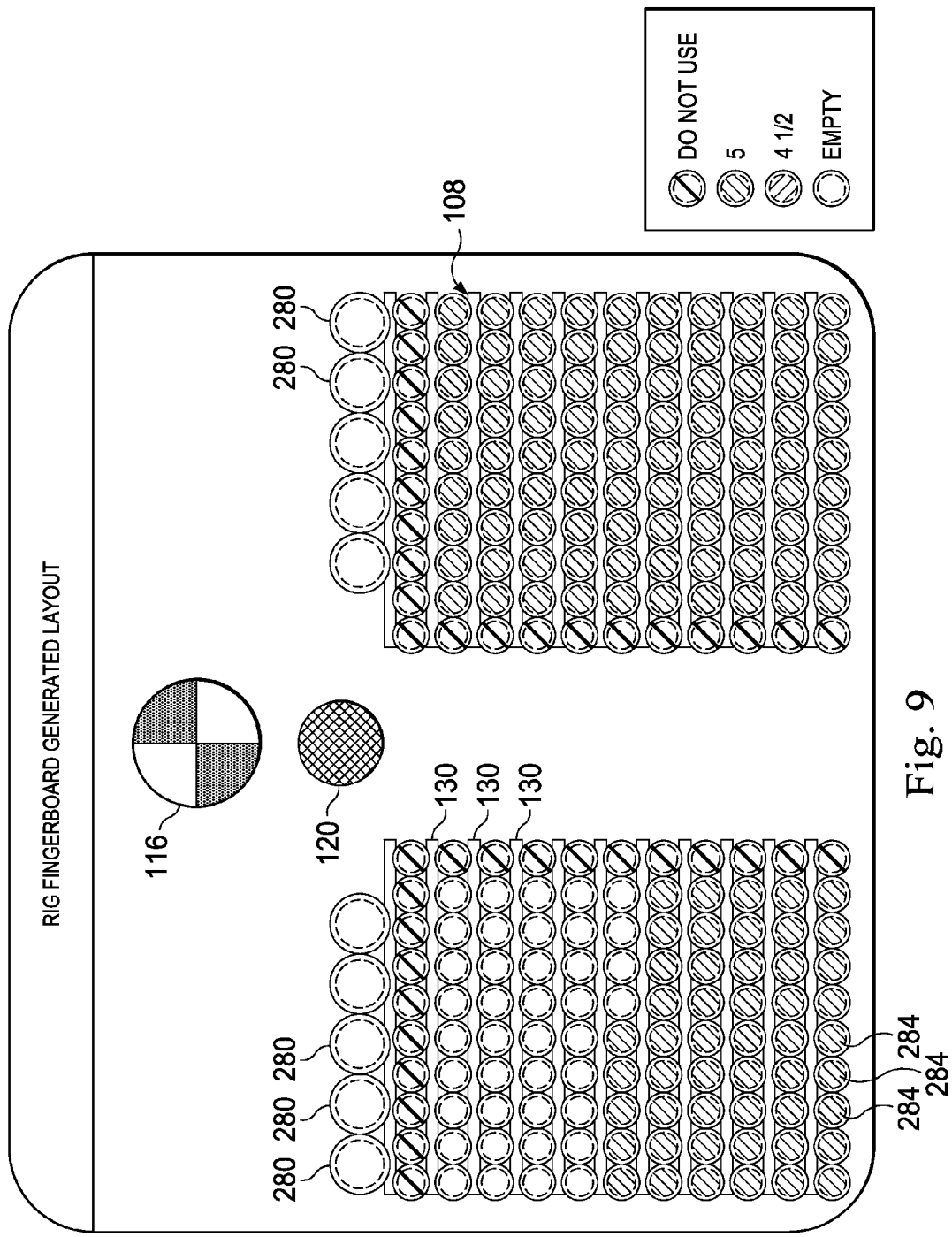
FIG. 9 is a schematic of a top view of a fingerboard according to one or more aspects of the present disclosure.

Taking into account the measured depth plus the drill past casing of 100 feet and a BHA of 130 feet, 13038+100−130=13038 feet. The tubular management system 184 may determine that 139.87 stands are required for the third portion of the well plan. Therefore, the tubular management system 184 allocates 140 locations in the fingerboard 108 for the third section of the well plan. Therefore, the well plan may allocate 16 rows within the fingerboard 108 for stands to execute the well plan, as shown in FIG. 9.

Again, it is worth noting that the third section of the wellplan includes or adds to the first and second sections of the well plan. Here, the casing section for the third section of the well plan utilizes drill pipe stands having the same diameter as the drill pipe stands utilized with the casing sections for the first and second sections of the wellplan. Therefore, the drill pipe stands for the third casing section appear indistinguishable from the drill pipe stands of the first and second casing sections in FIG. 8. As indicated above, in other examples however, the stands of third casing section have a different diameter than the drill pipe stands for the first or second casing sections.

In some embodiments, the tubular management system 184 may allocate locations in the fingerboard 108 closest to well center. This may provide efficiency as the racker device 104 moves stands from the fingerboard 108 to well center 116 and from well center 116 to the fingerboard 108. In another embodiment, In addition, as discussed above, some stands or tubulars are subjected to higher stress than others based on the location of the tubular within the drill string. For example, tubulars or stands closer to the surface in the drill string may be subject to higher stress than tubular or stands closer to the BHA. Likewise those stands subjected to tortious pathways in the geological formations may be subjected to high stress. Therefore, as tubulars are used to make stands, the tubular management system 184 may take into account data from the asset management system 186 and may place the stands in the fingerboard 108 based on their expected useful life and prior history to minimize the chance of inadvertent premature failure. For example, stands comprising tubulars historically subjected to high stress at prior well sites may be disposed at a location in the fingerboard 108 corresponding to a location that will be subjected to lower stresses in the current well site. This may reduce risk of tubular failure that would slow the drilling operation and create inefficiencies in rig operations.

Figure 10:
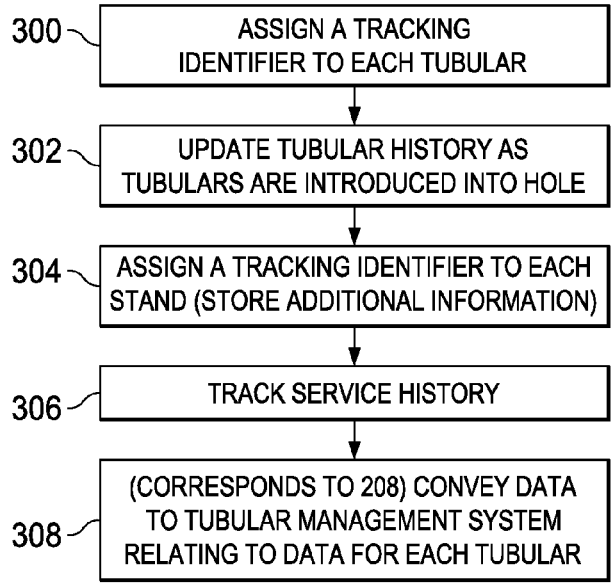
FIG. 10 is a flow-chart diagram of at least a portion of a method according to one or more aspects of the present disclosure.

FIG. 10 shows an exemplary method performed by the asset management system 186 that generates data for the tubular management system 184. This may begin at 300 where a tracking identifier is assigned to each tubular that will be used at the well site. In some embodiments, the tracking identifier is maintained throughout the life history of the tubular. Accordingly as the tubular is moved from well site to well site and reused during drilling, the historical data may provide an indication of the remaining useful life. Specification information relating to the tubular may be indicated on the tracking identifier. For example, the tracking identifier may represent information such as manufacturer information, manufacturer date, diameter size, material type, range type, length, and weight. Other information relating to the tubular or stand may also be recorded. At 302, the tubular history in the asset management system 186 is updated as tubulars are introduced into the hole. To do this, the tubulars may be scanned at the well center, or their position may be tracked and the system may recognize when the tubular is introduced at the wellbore. The expected wear and expected applied stress may then be added to the historical data for the tubular in the asset management system 186.

At 304, a tracking identifier may be assigned to each stand. Accordingly, additional information related to the stands or tubulars may be recorded and tracked. Again, the information may include information similar to that stored for the individual tubulars, such as manufacturer information such as manufacturer date, diameter size, material type, range type, length and weight.

At 306, the asset management system 186 tracks and updates the service history record for the particular tubular or stand. For example, the service history may include stress history based on prior use such as depth, load, or other factors. In addition, tracking the service history may include tracking inspection dates, and changes in length and weight of the tubulars, including current length and current weight.

At 308 in FIG. 10, which corresponds to step 208 in FIG. 3, information from the asset management system 186 may be conveyed to the tubular management system 184 for each tubular. The tubular management system 184 may operate in the manner discussed above with reference to FIG. 3.

The tubular management system 184 may employ algorithms that utilize historical and well plan information to manage the stress levels that the drill pipes may be subjected to by rotating the position of stands in the drill string throughout the drill pipe's life. For example, for a particular stand, a current location may be assigned in a location corresponding to a fourth row, sixth in order. A future location may be assigned as location in the eighth row, sixth in order. Accordingly, the tubular management system 384 may operate the racker device 104 in a manner to store the stand in a position within the fingerboard 108 corresponding to the order in which it will be introduced to the well bore. Therefore, based upon a reading of the tubular identifier and a validation of length and weight and a confirmation that the tubular section is within inspection criteria, the racking control system 180 may recommend a location of the stand within the drill string and a setback location based on the well plan and casing sections utilizing the stress history of each stand.

Figure 11:
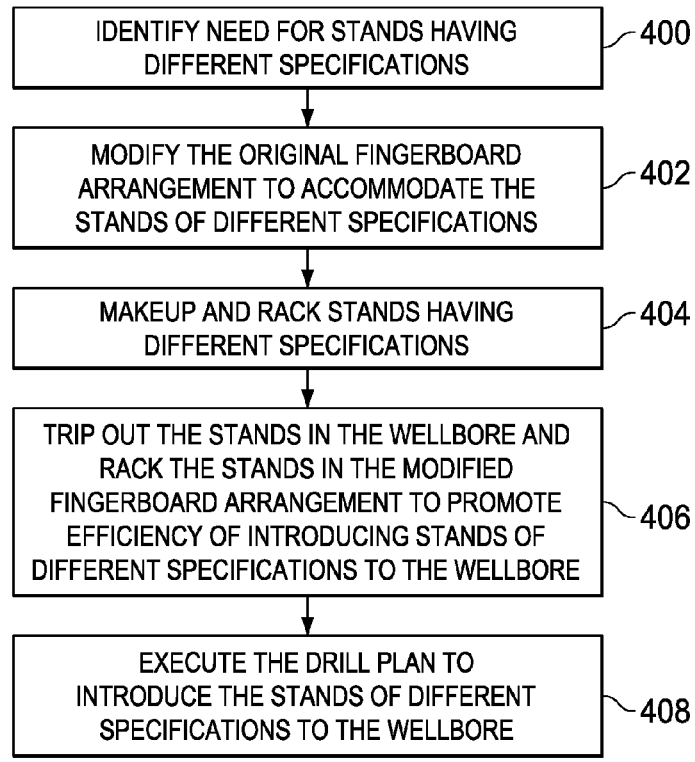
FIG. 11 is a flow-chart diagram of at least a portion of a method according to one or more aspects of the present disclosure.

FIG. 11 shows a method of rearrangement of stand locations within the fingerboard 108 based upon data indicating applied stress and historical data of tubulars and stands. At 400 in FIG. 11, the tubular management system 184 identifies the need for stands having different specifications. This may be a consequence of a modified well plan, string failure, or for other reason. At 402, the tubular management system 184 modifies the original proposed fingerboard arrangement to accommodate the stands having different specifications. In some examples, this may include modifying the plan to locate stands having different diameters in different locations within the fingerboard. For example, this may include reallocating stand locations for a particular size of stand to accommodate stands of another size.

At 404, the tubular management system 184 may control the racker device 104 to make up and rack a stand having specifications different than those originally called out. These new stands may be assessed and ordered in the manner described above at 214 to 216 in FIG. 3. At 406, the racker device 104 may trip out the stands in the well bore and rack the stands according to the modified fingerboard arrangement to promote efficiency of introducing stands of different specifications into the well bore. At 408, the tubular management system 184 may execute the drill plan to introduce the stands of different specifications to the well bore while updating the asset management system 186 as discussed above at 222.

Figure 12:
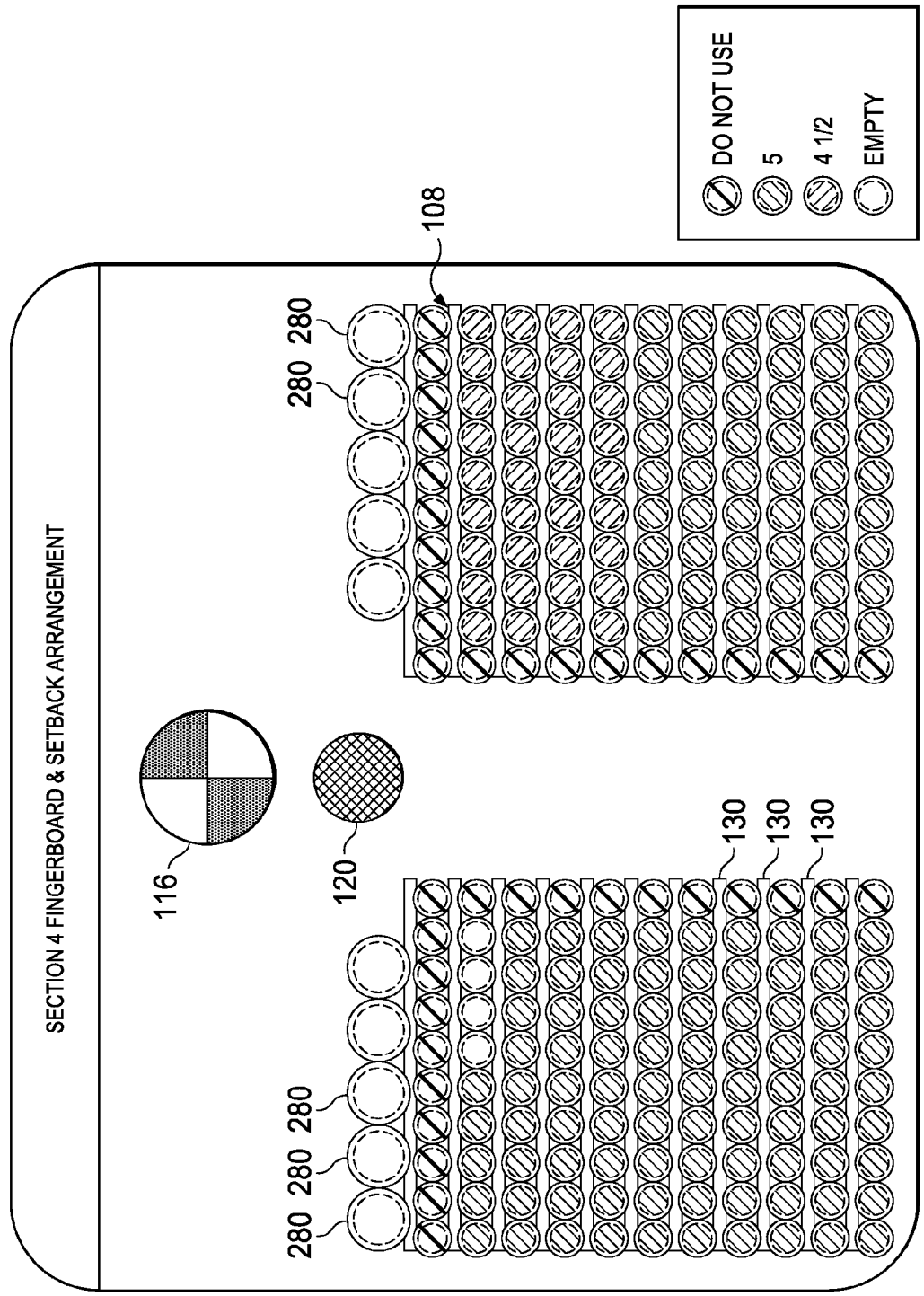
FIG. 12 is a schematic of a top view of a fingerboard according to one or more aspects of the present disclosure.

FIG. 12 shows one rearrangement example that may be performed during tripping of the pipe of the third section of the well plan. In this example, the tubular management system 184 may require rearrangement of the stands at a fourth section in the well plan. In this example, the fourth section utilizes 4½ inch drill pipe to reduce the drill string weight. The 4½ inch drill pipe will be located closest to the bit. Therefore, the tubular management system may modify the proposed racking plan during tripping to allocate a portion of the fingerboard 108 for the 4½ inch drill pipe. In FIG. 12, and compared to FIG. 9, the locations of the 5 inch drill pipe have been modified to accommodate the 4½ inch drill pipe. Accordingly, drilling may occur in an efficient and effective manner while minimizing downtime of the rig system.

In view of all of the above and the figures, one of ordinary skill in the art will readily recognize that the present disclosure introduces a drilling rig apparatus comprising: a racker device for moving tubular stands on a drilling rig; a fingerboard cooperatively disposed to receive tubular stands from the racker device and to support the tubular stands in a vertical arrangement; and a racking control system in communication with the racker device and configured to control the racker device, the racking control system comprising a tubular management system that receives data relating to a well plan and driller settings, assesses the well plan and driller settings, and based on the well plan and driller settings, develops a racking plan setting out proposed racking locations for the tubular stands to be used in a drilling procedure.

In an aspect, the tubular management system is configured to receive driller preferences for a drilling rig, and wherein the racking control system is based in part on the driller preferences as the racking plan is developed. In an aspect, the tubular management system is configured to determine the number of tubular stands required to make up a drilling section of the well plan and allocate locations in the fingerboard for each of the tubular stands. In an aspect, the driller settings include at least one of tubular arrangement, location in fingerboard for bottom hole assembly, and drill pipe size, the racking control system configured to take the driller settings into account when developing the racking plan. In an aspect, the well plan specifies BHA and hole size by casing section, the racking control system being configured to take the BHA and hole size into account when developing the racking plan. In an aspect, the tubular management system is configured to allocate a racking location for a tubular stand based on historical data for one or more tubulars or tubular stands. In an aspect, the racking control system comprises an asset management system configured to track information relating to specific tubulars or tubular stands. In an aspect, the information includes historical loading information including an amount of stresses applied to a tubular or tubular stand. In an aspect, the information includes specification of particular tubular of a tubular stand including at least one of a length, a diameter, and a manufacturer. In an aspect, the asset management system shares a memory, a processor, or both, with the tubular management system.

The present disclosure also introduces a method of developing a racking plan for a drilling rig, which comprises: receiving information for a well plan in a racking control system for drilling a wellbore with a drilling rig; receiving driller setting information in a racking control system; and determining a fingerboard plan with the racking control system that assesses the received well plan information and the received driller setting information and, based on the assessment, allocates tubular stand locations within a fingerboard for tubular stands to carry out the well plan.

The method may also include generating control signals with the racking control system to control a racker device to make up tubular stands and rack the tubular stands in the allocated locations in the fingerboard. The method may also include determining the number of tubular stands required to make up a drilling section of the well plan and allocating locations in the fingerboard for the stands based on the number of tubular stands required to make the drilling section. In an aspect, receiving the driller settings comprises receiving at least one of a tubular arrangement in a fingerboard, a location in the fingerboard for a bottom hole assembly (BHA), and a drill pipe size. In an aspect, receiving the well plan includes receiving at least one of BHA and hole size by casing section, a mud depth, or a total vertical depth from the drilling rig. The method may also include taking into account historical data relating to one or more specific tubular to be used to make up one or more of the tubular stands, with the historical data being used to allocate a position in the fingerboard for a tubular stand comprising each specific tubulars. In an aspect, taking into account historical data comprises taking into account historical loading information including the amount of stresses applied to a tubular or tubular stand. In an aspect, taking into account historical data comprises taking into account at least one of a length, a diameter, and a manufacturer. The method may also include an automated rig control system where the racking control system is integrated into the automated rig control system resulting in the automated rig control system having autonomous control capability for controlling all functions of the rig including drawworks, top drive, mud pumps, roughneck, racking, hydraulic elevators, slips, solids control, power systems, and anti-collision.

The present disclosure also introduces a non-transitory computer readable medium with computer executable instructions stored thereon for determining racking locations in a fingerboard for tubulars and tubular stands, the computer executable instructions comprising instructions for: receiving information regarding a well plan in a racking control system for drilling a wellbore with a drilling rig; receiving driller setting information in a racking control system; and determining a fingerboard plan with the racking control system that assesses the received well plan information and the received driller setting information and, based on the assessment, allocates tubular stand locations within a fingerboard for tubular stands to carry out the well plan.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. §112(f) for any limitations of any of the claims herein, except for those in which the claim expressly uses the word "means" together with an associated function.

What is claimed is:

1. A drilling rig apparatus comprising:
   a racker device for moving tubular stands on a drilling rig;
   a fingerboard cooperatively disposed to receive tubular stands from the racker device and to support the tubular stands in a vertical arrangement; and
   a racking control system in communication with the racker device and configured to control the racker device, the racking control system comprising a tubular management system that receives data relating to a well plan specific to a well to be drilled and that also receives driller settings, assesses the well plan and driller settings, and based on the well plan and driller settings, develops a racking plan setting out proposed racking locations for the tubular stands to be used in a drilling procedure.

2. The drilling rig apparatus of claim 1, wherein the tubular management system is configured to receive driller preferences for a drilling rig, and wherein the racking control system is based in part on the driller preferences as the racking plan is developed.

3. The drilling rig apparatus of claim 1, wherein the tubular management system is configured to determine the number of tubular stands required to make up a drilling section of the well plan and allocate locations in the fingerboard for each of the tubular stands.

4. The drilling rig apparatus of claim 1, wherein the driller settings include at least one of tubular arrangement, location in fingerboard for bottom hole assembly, and drill pipe size, the racking control system configured to take the driller settings into account when developing the racking plan.

5. The drilling rig apparatus of claim 1, wherein the well plan specifies BHA and hole size by casing section, the racking control system being configured to take the BHA and hole size into account when developing the racking plan.

6. The drilling rig apparatus of claim 1, wherein the tubular management system is configured to allocate a racking location for a tubular stand based on historical data for one or more tubulars or tubular stands.

7. The drilling rig apparatus of claim 1, wherein the racking control system comprises an asset management system configured to track information relating to specific tubulars or tubular stands.

8. The drilling rig apparatus of claim 7, wherein the information includes historical loading information including an amount of stresses applied to a tubular or tubular stand.

9. The drilling rig apparatus of claim 7, wherein the information includes specification of particular tubular of a tubular stand including at least one of a length, a diameter, and a manufacturer.

10. The drilling rig apparatus of claim 7, wherein the asset management system shares a memory, a processor, or both, with the tubular management system.

11. A method of developing a racking plan for a drilling rig, which comprises:
receiving, in a racking control system, information for a well plan specific to a well to be drilled;
receiving driller setting information in a racking control system; and
determining a fingerboard plan with the racking control system that assesses the received well plan information and the received driller setting information and, based on the assessment, allocates tubular stand locations within a fingerboard for tubular stands to carry out the well plan.

12. The method of claim 11, which further comprises: generating control signals with the racking control system to control a racker device to make up tubular stands and rack the tubular stands in the allocated locations in the fingerboard.

13. The method of claim 11, which further comprises determining the number of tubular stands required to make up a drilling section of the well plan and allocating locations in the fingerboard for the stands based on the number of tubular stands required to make the drilling section.

14. The method of claim 11, wherein receiving the driller settings comprises receiving at least one of a tubular arrangement in a fingerboard, a location in the fingerboard for a bottom hole assembly (BHA), and a drill pipe size.

15. The method of claim 11, wherein receiving the well plan includes receiving at least one of BHA and hole size by casing section, a mud depth, or a total vertical depth from the drilling rig.

16. The method of claim 11, which further comprises taking into account historical data relating to one or more specific tubular to be used to make up one or more of the tubular stands, with the historical data being used to allocate a position in the fingerboard for a tubular stand comprising each specific tubulars.

17. The method of claim 16, wherein taking into account historical data comprises taking into account historical loading information including the amount of stresses applied to a tubular or tubular stand.

18. The method of claim 16, wherein taking into account historical data comprises taking into account at least one of a length, a diameter, and a manufacturer.

19. The method of claim 16, comprising an automated rig control system and wherein the racking control system is integrated into the automated rig control system resulting in the automated rig control system having autonomous control capability for controlling all functions of the rig including drawworks, top drive, mud pumps, roughneck, racking, hydraulic elevators, slips, solids control, power systems, and anti-collision.

20. A non-transitory computer readable medium with computer executable instructions stored thereon for determining racking locations in a fingerboard for tubulars and tubular stands, the computer executable instructions comprising instructions for:
receiving, in a racking control system, information regarding a well plan specific to a well to be drilled;
receiving driller setting information in the racking control system; and
determining a fingerboard plan with the racking control system that assesses the received well plan information and the received driller setting information and, based on the assessment, allocates tubular stand locations within a fingerboard for tubular stands to carry out the well plan.

* * * * *